(12) United States Patent
Wang

(10) Patent No.: US 8,942,485 B2
(45) Date of Patent: Jan. 27, 2015

(54) ELECTRONIC DEVICE AND METHOD FOR RECOGNIZING FEATURES OF OBJECTS

(71) Applicants: Hong Fu Jin Precision Industry (ShenZhen) Co., Ltd., Shenzhen (CN); Hon Hai Precision Industry Co., Ltd., New Taipei (TW)

(72) Inventor: Guang-Jian Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/014,476

(22) Filed: Aug. 30, 2013

(65) Prior Publication Data

US 2014/0099032 A1  Apr. 10, 2014

(30) Foreign Application Priority Data

Oct. 9, 2012 (CN) .......................... 2012 1 0378665

(51) Int. Cl.
*G06K 9/50* (2006.01)
*G06K 9/00* (2006.01)
*G06K 9/46* (2006.01)

(52) U.S. Cl.
CPC .......... *G06K 9/4604* (2013.01); *G06K 9/00624* (2013.01)

USPC .......................................... 382/201; 382/103

(58) Field of Classification Search
None
See application file for complete search history.

(56) References Cited

U.S. PATENT DOCUMENTS 5,638,465 A * 6/1997 Sano et al. ..................... 382/281
2006/0188160 A1 * 8/2006 Matsumoto et al. .......... 382/190
2013/0279756 A1 * 10/2013 Menadeva et al. ............ 382/103

\* cited by examiner

*Primary Examiner* — Daniel Mariam
(74) *Attorney, Agent, or Firm* — Novak Druce Connolly Bove + Quigg LLP

(57) ABSTRACT

An electronic device stores haar-like features and geometrical features of an object. A reference image of the object is created according to the geometrical features of the object. An outline image is obtained from each image of the object. The electronic device calculates derivatives of each two adjacent points on the reference image and each outline image. A derivative matrix of the reference image and a derivative matrix of each outline image are generated. The electronic device generates a first derivative curve corresponding to the derivative matrix of the reference image and a second derivative curve corresponding to each derivative matrix of the outline image. When all the second derivative curves are the same as the first derivative curve, the electronic device determines whether each outline image is corresponding to the object by using the haar-like features of the object.

12 Claims, 4 Drawing Sheets

ELECTRONIC DEVICE AND METHOD FOR RECOGNIZING FEATURES OF OBJECTS

BACKGROUND

1. Technical Field

Embodiments of the present disclosure relate to image processing technology, and more particularly to an electronic device and a method for recognizing features of objects.

2. Description of Related Art

Haar-like features are digital image features used in object recognition. When an object is being recognized by haar-like features of the object, a time of obtaining features of the object from a image of the object depends on a size of the image. When the size of the image is large, the recognizing costs a lot of time.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in firmware, such as in an erasable programmable read only memory (EPROM). The modules described herein may be implemented as either software and/or hardware modules and may be stored in any type of non-transitory computer-readable medium or other storage system. Some non-limiting examples of non-transitory computer-readable media include CDs, DVDs, BLU-RAY, flash memory, and hard disk drives.

Figure 1:
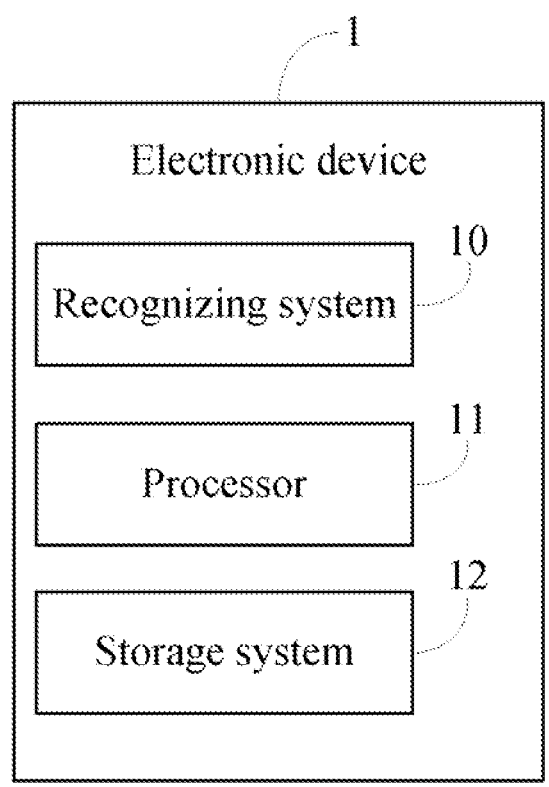
FIG. 1 is a block diagram of one embodiment of an electronic device including a recognizing system.

FIG. 1 is a block diagram of one embodiment of an electronic device 1 including a recognizing system 10, a processor 11, and a storage system 12. The electronic device 1 may be a computer, a pad, for example. The storage system 12 stores haar-like features and geometrical features of an object, and stores more than one image of the object.

Figure 2:
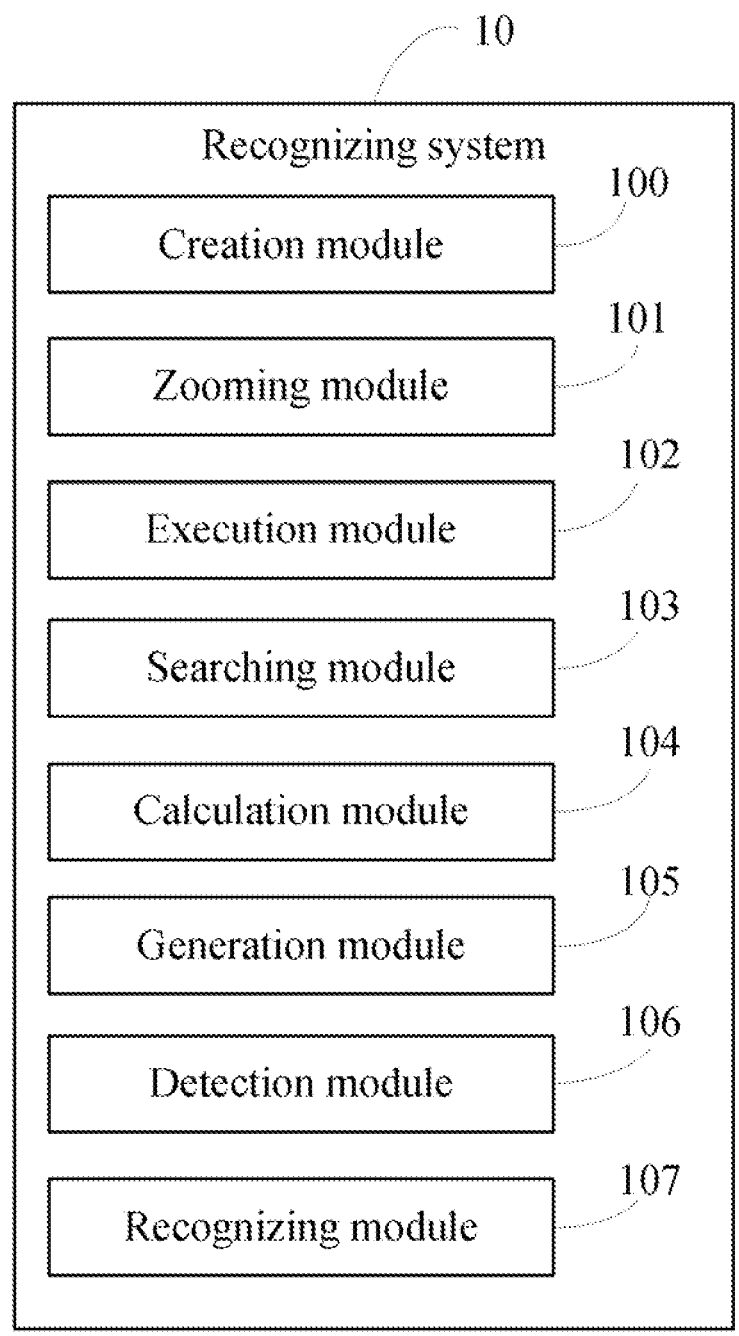
FIG. 2 is a block diagram of one embodiment of function modules of the recognizing system in FIG. 1.

As shown in FIG. 2, the recognizing system 10 includes a plurality of function modules, such as a creation module 100, a zooming module 101, an execution module 102, a searching module 103, a calculation module 104, a generation module 105, a detection module 106, and a recognizing module 107. The modules 100-107 include computerized code in the form of one or more programs that are stored in the storage system 12. The computerized code includes instructions that are executed by the processor 11, to provide functions of the recognizing system 10. Detailed functions of the modules 100-107 are given in reference to FIG. 3.

Figure 3:
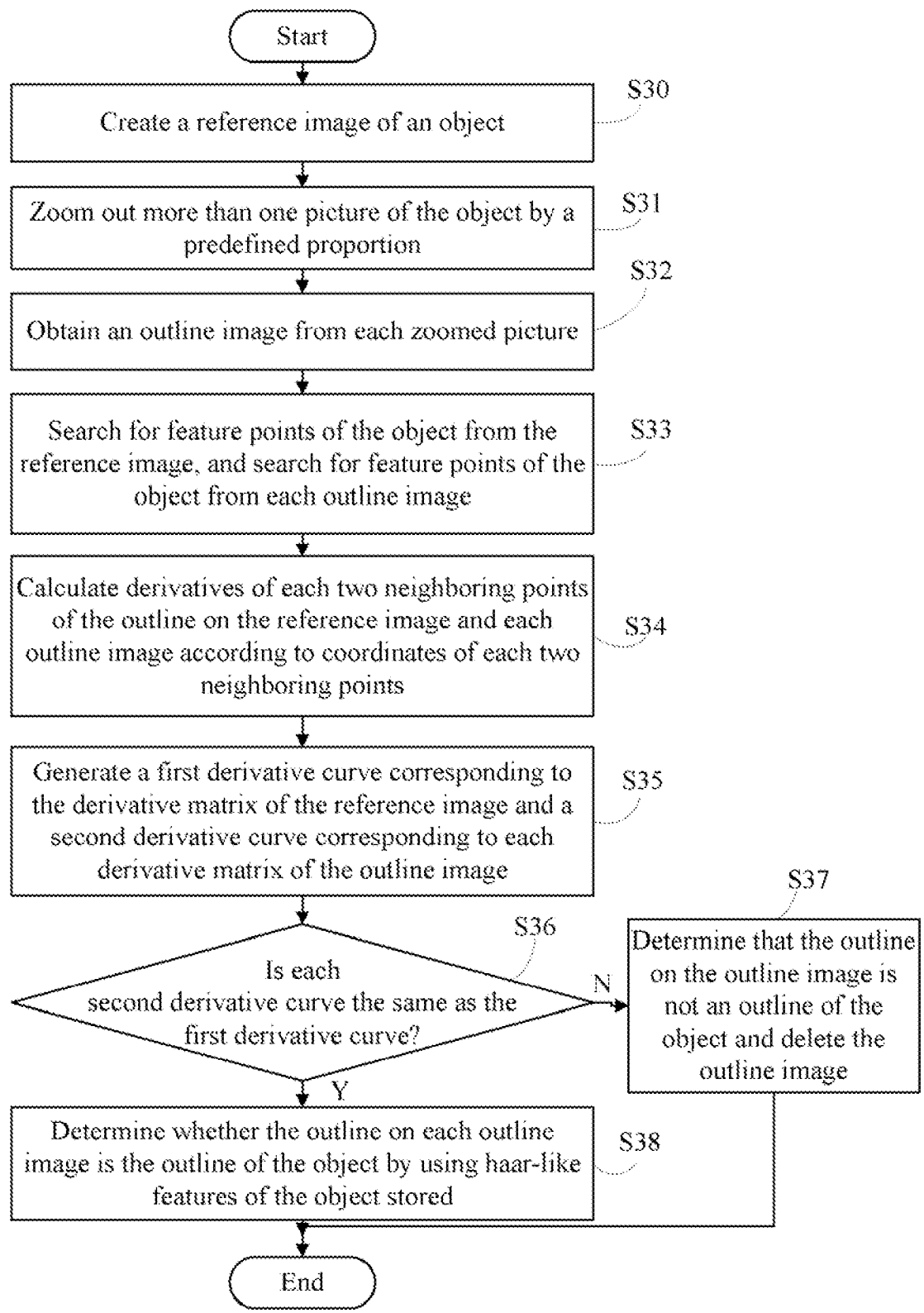
FIG. 3 is a flowchart of one embodiment of a method for recognizing features of objects.

FIG. 3 is a flowchart of one embodiment of a method for recognizing features of objects. Depending on the embodiment, additional steps may be added, others removed, and the ordering of the steps may be changed.

In step S30, the creation module 100 creates a reference image of the object according to the geometrical features of the object. For example, firstly the creation module 100 creates a 3D outline of the object. Then the 3D outline of the object projects to a plane. A projected image on the plane is regarded as the reference image of the object.

In step S31, the zooming module 101 zooms out the more than one image of the object stored in the storage system 12 by a predefined proportion. In one embodiment, the predefined proportion may be 1/20 of the original size of each image.

In step S32, the execution module 102 obtains an outline image from each zoomed image. In one embodiment, the execution module 102 converts each outline image to a binary image. The binary image is the outline image. Each obtained outline image presents an outline of the object.

In step S33, the searching module 103 searches for feature points of the object from the reference image, and searches for feature points of the object from each outline image.

For example, the searching module 103 generates a minimum enclosure rectangle of the object in the reference image. The searching module 103 further obtains two points which are farthest from each other from the minimum enclosure rectangle. The two points are taken as feature points of the object on the reference image. In another embodiment, the searching module 103 can obtain two points which are closest from each other from the minimum enclosure rectangle and takes the two points as the feature points.

Figure 4:
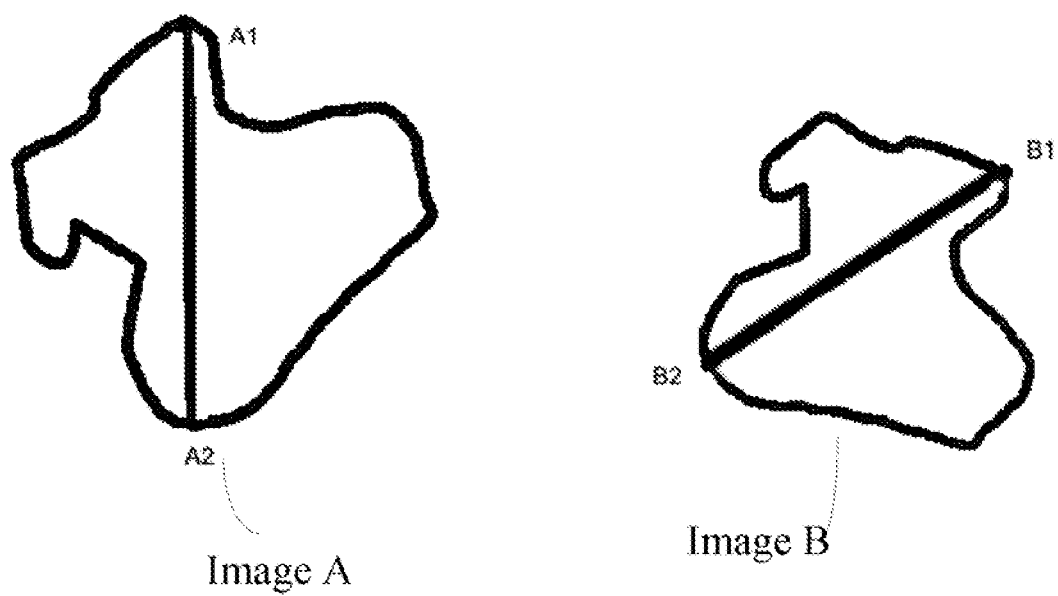
FIG. 4 is a schematic diagram illustrating one embodiment of a reference image and a binary image of an outline image of an object.

The feature points of the object in each outline image are searched according to a same method as searching for the feature points from the reference image. When the feature points on the reference image are the two farthest points, the feature points on each outline image are also two farthest points of the minimum enclosure rectangle of the object on each outline image. As shown in FIG. 4, the image A is the reference image of the object and the image B is the outline image of the object. The point A1 and the point A2 are the two farthest points in the reference image. The point B1 and the point B2 are the two farthest points in the outline image.

In step S34, the calculation module 104 takes a feature point in the reference image and a feature point in each outline image as start points and takes another feature point in the reference image and another feature point in each outline image as end points. The calculation module 104 obtains each two adjacent points from the start point to the end point in the reference image and in each outline image. The calculation module 104 further calculates derivatives of each two adjacent points of the outline of the object in the reference image and in each outline image according to coordinates of each two adjacent points. The calculation module 104 further generates a derivative matrix of the reference image according to the derivatives of each two adjacent points of the outline of the object in the reference image, and generates a derivative matrix of each outline image according to the derivatives of each two adjacent points of the outline of the object in each outline image. For example, as shown in FIG. 4, the feature point A1 (x1, y1) is the start point in the reference image. A next point adjacent the start point A1 is a point A'(x', y'). A derivative of the two adjacent points A and A' is (x'-x1)/(y'-y1).

In step S35, the generation module 105 generates a first derivative curve corresponding to the derivative matrix of the reference image and a second derivative curve corresponding to each derivative matrix of the outline image.

In step S36, the detection module 106 detects whether each second derivative curve is the same as the first derivative curve. If any second derivative curve is not the same as the second derivative curve, step S37 is implemented. If all the second derivative curves are the same as the first derivative curve, step S38 is implemented.

In step S37, the detection module 106 determines that the outline in the outline image is not an outline of the object and deletes the outline image. Then the procedure ends.

In step S38, the recognizing module 107 determines whether the outline in each outline image is the outline of the object using the haar-like features of the object stored in the storage system 12.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
   a processor; and
   a non-transitory computer-readable medium that stores one or more programs, which comprise instructions which when executed by the processor of the electronic device, performs operations of:
   (a) create a reference image of an object according to geometrical features of the object;
   (b) obtain an outline image from each image of the object;
   (c) search for feature points of the object from the reference image and each outline image;
   (d) obtain each two adjacent points on the reference image and each outline image according to the feature points of the object, calculate derivatives of each two adjacent points on the reference image and each outline image according to coordinates of each two adjacent points, and generate a derivative matrix of the reference image according to the derivatives of each two adjacent points of the reference image and generate a derivative matrix of each outline image according to the derivatives of each two adjacent points of the outline of each outline image;
   (e) generate a first derivative curve corresponding to the derivative matrix of the reference image and a second derivative curve corresponding to each derivative matrix of the outline image; and
   (f) determine whether each outline image is corresponding to the object by using a haar-like features of the object when all the second derivative curves are the same as the first derivative curve.

2. The electronic device as claimed in claim 1, wherein operation (a) comprises:
   create a 3D outline the object according to the geometrical features of the object; and
   project the 3D outline of the object to a plane to create a projected image as the reference image.

3. The electronic device as claimed in claim 1, before operation (b) further comprising:
   zoom out the more than one image of the object stored in the storage system by a predefine proportion.

4. The electronic device as claimed in claim 1, wherein the operations further comprise:
   determine that the outline image is not corresponding to the object and delete the outline image when the second derivative curve of the outline image is not the same as the first derivative curve.

5. A method being executed by a processor of an electronic device, comprising steps:
   (a) creating a reference image of an object according to geometrical features of the object;
   (b) obtaining an outline image of each image of the object;
   (c) searching for feature points of the object from the reference image and each outline image;
   (d) obtaining each two adjacent points on the reference image and each outline image according to the feature points of the object, calculating derivatives of each two adjacent points on the reference image and each outline image according to coordinates of each two adjacent points, and generating a derivative matrix of the reference image according to the derivatives of each two adjacent points of the reference image and generating a derivative matrix of each outline image according to the derivatives of each two adjacent points of the outline of each outline image;
   (e) generating a first derivative curve corresponding to the derivative matrix of the reference image and a second derivative curve corresponding to each derivative matrix of the outline image; and
   (f) determining whether each outline image is corresponding to the object by using a haar-like features of the object when all the second derivative curves are the same as the first derivative curve.

6. The method as claimed in claim 5, wherein step (a) comprises:
   creating a 3D outline the object according to the geometrical features of the object; and
   projecting the 3D outline of the object to a plane to create a projected image as the reference image.

7. The method as claimed in claim 5, before step (b) further comprising:
   zooming out the more than one image of the object stored in a storage system of the electronic device by a predefine proportion.

8. The method as claimed in claim 5, further comprising:
   determining that the outline image is not corresponding to the object and deleting the outline image when the second derivative curve of the outline image is not the same as the first derivative curve.

9. A non-transitory computer-readable medium having stored thereon instructions that, when executed by a processor of an electronic device, cause the processor to perform operations of:
   (a) creating a reference image of an object according to geometrical features of the object;
   (b) obtaining an outline image from each image of the object;
   (c) searching for feature points of the object from the reference image and each outline image;
   (d) obtaining each two adjacent points on the reference image and each outline image according to the feature points of the object, calculating derivatives of each two adjacent points on the reference image and each outline image according to coordinates of each two adjacent points, and generating a derivative matrix of the reference image according to the derivatives of each two adjacent points of the reference image and generating a derivative matrix of each outline image according to the derivatives of each two adjacent points of the outline of each outline image;
   (e) generating a first derivative curve corresponding to the derivative matrix of the reference image and a second derivative curve corresponding to each derivative matrix of the outline image; and (f) determining whether each outline image is corresponding to the object by using a haar-like features of the object when all the second derivative curves are the same as the first derivative curve.

10. The non-transitory computer-readable medium as claimed in claim 9, wherein operation (a) comprises:
 creating a 3D outline the object according to the geometrical features of the object; and
 projecting the 3D outline of the object to a plane to create a projected image as the reference image.

11. The non-transitory computer-readable medium as claimed in claim 9, before operation (b) further comprising:
 zooming out the more than one image of the object stored in a storage system of the electronic device by a predefine proportion.

12. The non-transitory computer-readable medium as claimed in claim 9, wherein the operations further comprise:
 determining that the outline image is not corresponding to the object and deleting the outline image when the second derivative curve of the outline image is not the same as the first derivative curve.

\* \* \* \* \*